Dec. 30, 1958  K. J. B. CLARK  2,866,632
VEHICLE RUBBER SPRING SUSPENSIONS
Filed July 2, 1957  2 Sheets-Sheet 1

INVENTOR
Kenneth John Benjamin Clark.
BY
Harness, Dickey & Pierce.
ATTORNEYS.

Dec. 30, 1958 K. J. B. CLARK 2,866,632
VEHICLE RUBBER SPRING SUSPENSIONS
Filed July 2, 1957 2 Sheets-Sheet 2
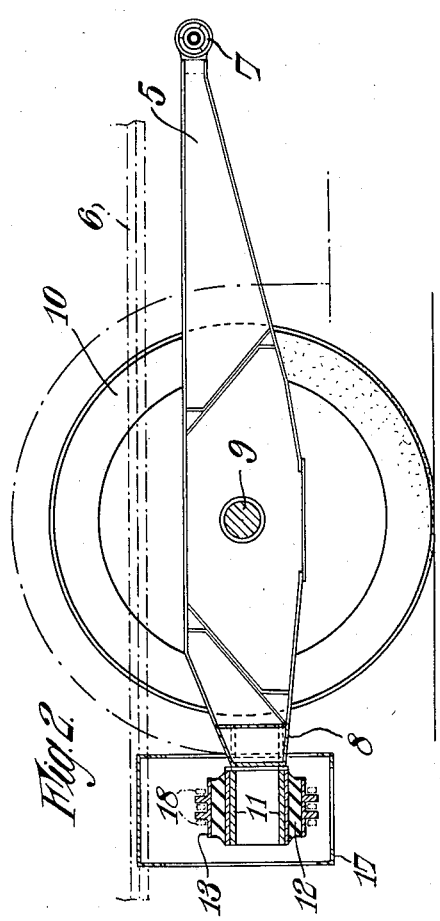
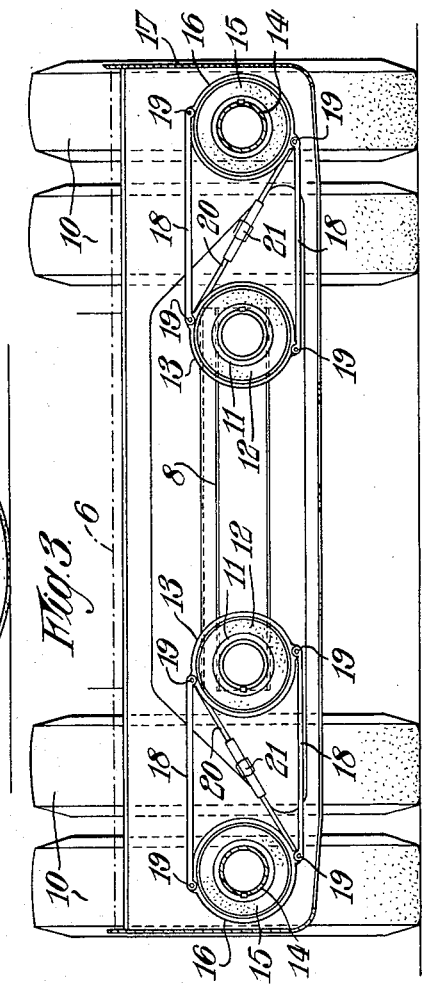
INVENTOR.
Kenneth John Benjamin Clark.
BY Harness, Dickey & Pierce.
ATTORNEYS.

United States Patent Office 2,866,632
Patented Dec. 30, 1958

2,866,632

VEHICLE RUBBER SPRING SUSPENSIONS

Kenneth John Benjamin Clark, Thurcaston, England, assignor to Metalastik Limited, Leicester, England Application July 2, 1957, Serial No. 669,589

Claims priority, application Great Britain July 11, 1956

1 Claim. (Cl. 267—57.1)

This invention relates to spring suspension systems for vehicles comprising a fore and aft extending beam on each side of an underframe or body of the vehicle, a pivotal connection between each beam and said underframe or body so as to permit relative up and down swinging movement between these parts, a mounting for a vehicle wheel on each beam, a cross tie connecting the two beams together near the outer end of each beam and a spring acting between each beam (or a part secured thereto near to the cross tie) and the underframe or body, said spring resisting said swinging movements. The object of this invention is to provide in a spring suspension system of the kind set forth an improved arrangement of spring between the beam and the underframe or body. More specifically an object of the present invention is to provide a spring system for a suspension of the kind set forth wherein the load/deflection characteristic of said springs is non-linear.

According to this invention a spring suspension of the kind set forth is characterised in that each spring between a beam (or an extension thereof) and the underframe or body comprises an inextensible pivoted suspension link with resilient bushes about its pivots in which the angular relationship of the link is varied by relative movement of the beam and the underframe the arrangement being that under tare loading conditions the load is carried by the bushes in torsion only whereas deflection of the system to either side of the tare loading position, as a result of loaded conditions causing displacement of the axis of the link pivots, is resisted with increased stiffness due to the bushes becoming eccentric as compressive components on the bushes are brought into play.

According to a preferred feature of the present invention the suspension link is formed of parallel spaced linked bars hinged to diametrically opposite points on outer metal sleeves of the resilient bushes about the pivots and thus each constitutes a hinged parallelogram across a diagonal of which a rigid member is hinged. The diagonal member may be a tie rod which is made variable as to its length preferably by incorporating in it a turn-buckle thus providing a means of pre-loading the resilient bushes of the assembly and resetting them to give a desired arrangement of the system e. g. to adjust the height of the underframe or body.

Two practical applications of the present invention will now be described, by way of example only, with reference to the accompanying drawings whereof:

Fig. 2 is a sectional side view of Fig. 1, and

Fig. 3 is an end view of Fig. 1.

Figure 1:
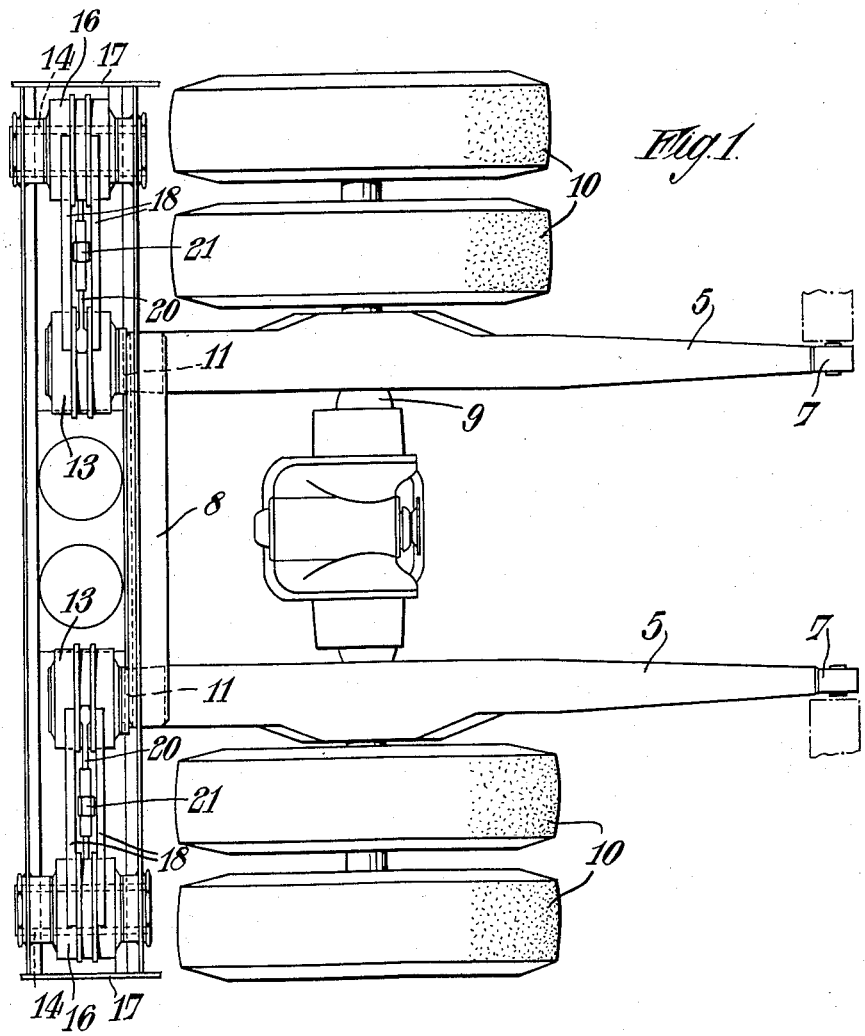
Fig. 1 is a plan view of one arrangement according to the present invention.

Referring to the accompanying drawing the spring suspension comprises fore and aft extending beams 5, one each side of an underframe or body of the vehicle 6 (Fig. 2), a pivotal connection 7 between each beam 5 and the underframe 6 so as to permit relative up and down swinging movement between these parts and a cross tie 8 between the ends of the beams 5 remote from the pivotal connection 7. An axle 9 for the wheels 10 of the vehicle is secured to each beam 5.

A pair of hollow pins 11 are carried by the cross tie 8 near to its connection with the beams 5 and there is non-rotatably mounted on each pin 11 a rubber bush 12 which is secured to an outer metal sleeve 13. A similar arrangement of pin 14, rubber bush 15 and outer metal sleeve 16 is provided, the pin 14 being carried by a sub-frame 17 secured to the underframe 6 of the vehicle it being appreciated, as shown in Fig. 3, that the assembly of parts 14, 15 and 16 is provided for each of the assemblies 11, 12 and 13. The outer metal sleeves 13, 16 are joined together by parallel spaced link bars 18 which are hinged, at 19, to diametrically opposite points on the metal sleeves 13, 16 so as to constitute a hinged parallelogram. A rigid member 20 is hinged to diagonal opposite points 19, the diagonal member 20 constituting a tie rod which is variable as to its length by means of a turnbuckle 21. In this way a means is provided of pre-loading the resilient bushes of the two assemblies and resetting them to give a desired arrangement of the system.

The axle 9 for the wheels 10 may incorporate resilient bushes or other similar devices which permit limited flexibility of the wheels on the beams 5.

It is preferred that the pivotal connection 7 between the beams 5 and the underframe 6 incorporate rubber bushes.

It is preferred with both constructions described that the sub-frame 17 be of flexible construction so that it will twist with roll of the body of the vehicle and it is arranged that the cross tie 8 connecting the beams 5 together comprises an upper and a lower flat strip each of which is flat in the horizontal plane. The ends of the cross tie 8, however, are of box construction to carry the pins 11.

In both constructions described the tare loading is carried by the rubber bushes 12 and 15 in torsion only and upon deflection of the system to either side of the tare loading position the pins 11, 14 are displaced and such displacement is resisted with increasing stiffness due to the bushes becoming eccentric as compressive components on the bushes are brought into play. In this way the load deflection curve has a non-linear characteristic.

In the construction illustrated the beams 5 are capable of limited independent swinging movement (the limitation being imposed by the cross tie 8 which when constructed as described above has considerable flexibility to accommodate vertical movements) so that the pairs of wheels on each side of the vehicle are to some extent independent.

The spring system provided according to this invention gives a wide spring base although the overall width is not great and therefore has the advantage over known suspensions comprising parallel, spaced beams 5 connected at their inner ends to the underframe (at 7) and at their outer ends to a cross tie 8 which have required that the beams carry outward extensions which support the springs with consequent increase in width. Moreover since with this invention the spring systems are in the horizontal plane of cross tie 8 so that a low floor level is possible for the vehicle.

I claim:

A road vehicle comprising an underframe, a beam extending lengthwise of the vehicle along each side thereof, a cross tie connecting the beams together near the rear end of the vehicle, a pivotal connection between each beam and the underframe inwardly of the rear end thereof the connection allowing vertical swinging movements of the beams as a unit, a wheel mounting on each beam, a road wheel carried by each mounting, an inextensible link extending transversely of the vehicle and substantially horizontally between each beam, near said cross tie, and the underframe, rubber bushes connecting the ends of each link to the beams and to the underframe for shear deformation about horizontal axes with said vertical swinging movements so that the angular relationship of the link is varied by relative movement of the beam and the underframe the tare load being carried by the bushes only in torsion and deflection of the beams to either side of their tare load position, as a result of loaded conditions causing displacement of the axes of the link pivots, being resisted with increased stiffness due to the bushes becoming eccentric as compressive components on the bushes are brought into play.

References Cited in the file of this patent

UNITED STATES PATENTS 2,509,769     Hirst _____ May 30, 1950

FOREIGN PATENTS 665,282     Great Britain _____ Jan. 23, 1952
665,283     Great Britain _____ Jan. 23, 1952